United States Patent [19]

Logan

[11] 4,368,584
[45] Jan. 18, 1983

[54] PICTURE FRAME ASSEMBLY COMPONENTS

[75] Inventor: Malcolm Logan, Barrington, Ill.

[73] Assignee: Logan Graphic Products, Inc., Wauconda, Ill.

[21] Appl. No.: 211,621

[22] Filed: Dec. 2, 1980

[51] Int. Cl.³ ............................................. G09F 1/12
[52] U.S. Cl. ..................................... 40/152; 403/401
[58] Field of Search ..................... 403/401, 402, 403; 40/155, 152.1, 156

[56] References Cited

U.S. PATENT DOCUMENTS

| | | | |
|---|---|---|---|
| 2,581,843 | 1/1952 | Edwards | 403/402 |
| 2,654,451 | 10/1953 | Schmidgall | 40/152 |
| 3,200,913 | 8/1965 | Nelson | 403/403 |
| 3,899,844 | 8/1975 | Munn | 40/152 |

FOREIGN PATENT DOCUMENTS

| | | | |
|---|---|---|---|
| 608459 | 11/1960 | Canada | 403/402 |
| 2162381 | 12/1971 | Fed. Rep. of Germany | 52/475 |
| 2831910 | 7/1978 | Fed. Rep. of Germany | 40/152 |
| 1460477 | 10/1966 | France | 403/402 |
| 6908188 | 5/1969 | Netherlands | 40/152 |
| 449916 | 9/1968 | Switzerland | 40/152 |

*Primary Examiner*—Gene Mancene
*Assistant Examiner*—Wenceslao J. Contreras
*Attorney, Agent, or Firm*—Dressler, Goldsmith, Shore, Sutker & Milnamow, Ltd.

[57] ABSTRACT

Components are provided for forming a picture frame which include frame sections adapted to be oriented at an angle to form a corner of the frame at adjacent ends of the sections. A bracket is provided for each corner and has a first leg and a second leg. One leg is disposed within a channel formed in one of the frame sections at the corner and the other leg is disposed within a channel of the other of the two frame sections at the frame corner. At least one of the legs of each bracket has a slanting engagement surface. A screw is threadingly engaged with one of the frame sections and also engages the bracket slanting engagement surface to urge the bracket leg along the frame section in which it is disposed in a direction away from the other frame section at the corner to draw the facing regions of the two frame sections together at the corner.

18 Claims, 15 Drawing Figures fig. 5 fig. 6 fig. 7 fig. 14 fig. 15

PICTURE FRAME ASSEMBLY COMPONENTS

DESCRIPTION

1. Technical Field

This invention relates to components for constructing a picture frame suitable for framing pictures, documents and the like that are to be displayed for viewing.

2. Background Of The Invention

A variety of picture frame structures are in use today or have been suggested for use. Typically, such picture frames are adapted to receive a glass, a mat defining a border around the inside of the frame, the picture or document to be displayed, and a backing board along with suitable devices for retaining the glass, mat, picture, and backing board in the frame. Further, hanger devices are usually provided for being attached to the back of the frame to permit the framed picture to be hung from a nail, screw, or suitable clip mounted to, and projecting from, a vertical wall.

Some frame structures can be provided in the form of packaged components which may be assembled by the retail purchaser to form a complete frame. Other frame structures are typically fabricated and sold to the consumer as a completed, ready-made frame.

Frame structures commonly incorporate a plurality of moldings, channels, or frame sections which are shaped at their ends to form a miter joint corner. Further, the adjacent ends of the frame sections at the frame corner are typically secured together in some fashion through the use of an L-shaped bracket which is disposed at the corner of the frame so that each leg of the bracket extends along or in one of the adjacent frame sections. Examples of such frame corner constructions are illustrated in the U.S. Pat. Nos. 3,965,601; 3,698,114; 3,603,627; 3,534,490; 3,492,034; 3,445,950; 3,317,227; 3,275,356; 2,996,159; 2,947,391; 2,805,506; 2,654,451; and 2,581,843. An L-shaped bracket for joining members of a window frame is disclosed in U.S. Pat. No. 2,844,233.

With many of the frame structures disclosed in the above-listed patents, the picture or other item to be inserted in the frame for display must be inserted from an open end or side of the frame. Typically, three sides of the frame are initially assembled to provide an opening along the fourth side through which the glass, mat, picture, and backing board are all slid into position. Subsequently, the fourth frame section is then secured to complete the frame assembly.

It is believed that the proper mounting of a picture within a frame assembly can be better effected after all of the frame sections have been completely assembled to form the frame. In such a case, the picture can be first secured, if desired, to a suitable backing sheet or board and the picture and backing sheet can then be properly aligned with a mat on top of the glass through the fully open back of the pre-assembled frame. Since the glass, mat, picture, and backing board can be placed directly into the frame through the open back of the frame, the mat and the picture can be easily and accurately aligned.

Further, since the mat, picture, and backing board do not have to be slid into the frame from an open end of the frame, they cannot be damaged from being pushed along and against the frame sections. Further, the avoidance of any sliding action relative to the frame precludes the imposition of frictional forces which may tear the picture or damage an adhesive mounting of the picture to the backing board.

A back-loading frame has another desirable feature. The back-loading frame permits easy and relatively quick removal of the picture or document from the frame without requiring partial or complete disassembly of the frame sections. Typically, only a few clamping devices need be removed from the frame to permit the picture or document to be taken out of the frame.

In view of the above-discussed advantages of a back-loading frame, it would be desirable to provide picture frame assembly components from which a picture frame can be assembled that permits loading of the assembled frame with the glass, mat, picture, and backing board through a fully open back region of the frame.

Devices for holding the mat, picture, and backing board against the glass in a frame have been disclosed in a number of patents. See, for example, the U.S. Pat. Nos. 3,965,601; 3,603,627; 2,805,506; and 2,581,843. It would be desirable to provide a relatively simple and inexpensive device that could be used with a back loading frame to maintain the picture in place within the frame. Preferably such a device would also function as means for permitting the frame to be hung on a wall.

With a back loading frame, it would be desirable to provide a means for joining the adjacent frame sections to insure that the sections are tightly locked together at the corners. Further, for ease of assembly, it would be desirable to provide components for assembling a frame from four frame sections wherein each of the four corners of the frame could be tightly secured with a minimum of fastening elements.

Preferably, it would be desirable to provide four frame sections for constructing a rectangular frame wherein only four fastening elements or screws need be used.

There are a variety of devices for use with a picture frame to enable the frame to be hung on a vertical wall. See, for example the U.S. Pat. Nos. 2,805,506 and 2,581,843. It would be desirable to provide a device mountable to the picture frame for hanging the frame on a vertical wall with conventional picture frame hanging wire over a nail, screw, or clip projecting from the wall. Further, it would be desirable to provide such a device having the capability of being easily and rapidly adjustable along the vertical sides of the frame so as to permit the desired positioning of the wire relative to the picture frame. Also, it would be advantageous if the device, when secured to the wire, could be quickly and easily locked into position relative to the vertical sides of the picture frame.

With a smaller picture frame, it is frequently desired to place the frame on a substantially horizontal flat surface, such as a table or the like, in a nearly vertical orientation. Devices for supporting a picture frame in such an orientation are well known. For example, see U.S. Pat. No. 2,581,843.

The structures for supporting a picture frame in a nearly vertical orientation on a horizontal surface typically include an easel brace or support member that is angled outwardly and downwardly from the back of the frame. Such members are generally unattractive and are conspicuous when the frame is viewed from the side or back.

It would be desirable to provide a rigid support means for maintaining a frame in a substantially vertical orientation on a support surface wherein the support means can be securely, but adjustably, positioned on the frame and wherein the support means would lie along the horizontal surface so as to be as relatively unobtrusive.

SUMMARY OF THE INVENTION

Components are provided for fabricating a picture frame which include a plurality of substantially identical frame sections. Typically, four frame sections are provided for forming a four-sided, rectangular or square picture frame. Each frame section has a side wall defining a first channel along its length for facing inwardly when the section is assembled with the other sections to form the frame. Each section has a pair of spaced-apart flanges extending from opposite sides of the first channel to define a narrow opening to the first channel.

A bracket is provided with first and second legs which are disposed at an angle substantially identical to the angle formed by any two adjacent frame sections at a frame corner. The bracket legs have dimensions of width and thickness whereby the bracket can be disposed within the first channels of two frame sections at a frame corner. The width of the legs is greater than the opening defined by the first channel flanges thereby to retain the bracket within the first channels of each of two frame sections at a corner of the frame.

The first leg also defines a slanting engagement surface. In the preferred embodiment, the first leg has a slot located at a predetermined position along the length of the first leg and one of the side walls of the slot is defined by the slanting engagement surface. The plane of the slanting engagement surface is, in the preferred embodiment, normal to the plane defining the length and width dimensions of the leg. The slanting engagement surface is at an obtuse angle relative to the length of the first leg and faces away from the distal end of the first leg.

In one of the preferred embodiments, the second leg of the bracket is disposed within one of the two frame sections forming a corner of the frame and is swaged into tight engagement with that frame section. The other of the two frame sections forming the frame corner has a threaded bore communicating from the exterior of the frame section to the first channel. A screw is disposed within the bore and threadingly engaged with the frame section.

A distal end of the screw projects into the first channel and is received within the slot in the first leg of the bracket which is disposed within the first channel of that frame section. Tightening the screw forces the end of the screw against the slanted engagement surface of the bracket first leg to urge the first leg along the length of the frame section in a direction away from the adjacent frame section forming the corner. This draws the facing regions of the two frame sections tightly together at the corner.

In the preferred embodiment, additional components are provided for cooperating with the frame sections. These include a resilient member for holding the picture properly within the frame as well as a pair of clips that may be quickly and easily secured to the frame and which serve to hold a frame hanging wire strung between the clips. A support member may also be provided for being slidably mounted to one of the frame sections for supporting the frame in a nearly vertical orientation on a substantially horizontal support surface on which the support member and the engaged frame section are placed.

Numerous other advantages and features of the present invention will become readily apparent from the following detailed description of the invention and embodiments thereof, from the claims, and from the accompanying drawings.

BRIEF DESCRIPTION OF THE DRAWINGS

In the accompanying drawings forming part of the specifications, and in which like numerals are employed to designate like parts throughout the same.

DESCRIPTION OF THE PREFERRED EMBODIMENT

While this invention is susceptible embodiment in many different forms, there are shown in the drawings and will herein be described in detail preferred embodiments of the invention. It will be understood, however, that the present disclosure is to be considered as an exemplification of the principles of the invention and is not intended to limit the invention to the embodiments illustrated.

The precise shapes and sizes of the components herein illustrated are not essential to the invention unless otherwise indicated.

Figure 1:
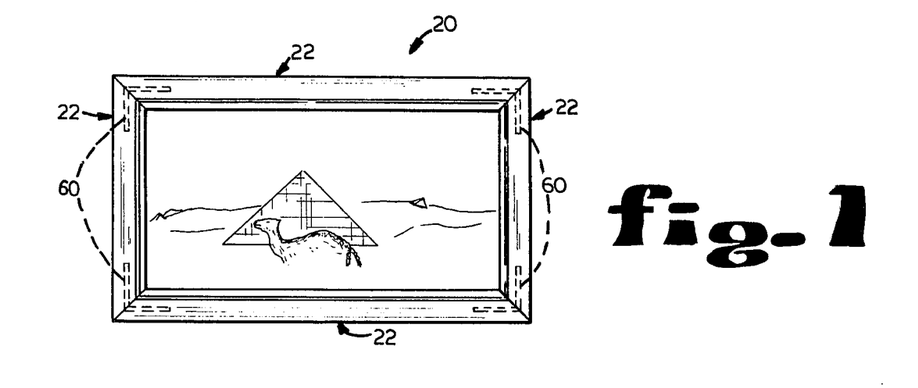
FIG. 1 is a front elevation view of a picture frame assembled from components constructed in accordance with the teachings of the present invention and showing a picture disposed within the frame.

Referring now to the drawings, FIG. 1 shows a frame 20 assembled from the components fabricated in accordance with the teachings of the present invention. The frame 20 has a generally rectangular configuration and comprises a plurality of individual frame sections 22. Two adjacent frame sections are joined at each corner of the frame by a novel bracket and locking means described in detail hereinafter.

Preferably the frame sections 22 have identical cross-sections. The rectangular frame 20 illustrated in FIG. 1 is most efficiently formed from four such frame sections 22 wherein the frame sections have lengths as necessary to provide the size and shape frame desired.

The frame sections 22 may be extruded or otherwise fabricated from aluminum. However, other metallic, as well as non-metallic materials, may be used. Preferably, however, the frame section material is sufficiently rigid and durable to function adequately as a frame and to permit the adjacent frame sections at each corner of the frame to be drawn tightly together by the novel bracket and locking means described in detail hereinafter.

Figure 3:
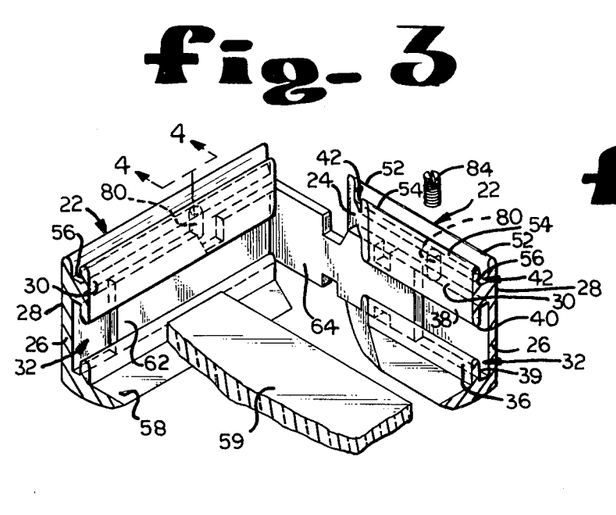
FIG. 3 is an enlarged, partially exploded, perspective view of the corner of the picture frame showing the manner in which the bracket cooperates with the picture frame sections to form a firm, tight, rigid corner.

The cross-section of each frame 22 is best illustrated in FIG. 3 where two adjacent frame sections 22 are shown just prior to being finally assembled together to form a corner of the frame. Each frame section obviously has two ends, only one end of each frame section 22 being illustrated in FIG. 3. The adjacent ends of each of the two frame sections 22 illustrated in FIG. 3 each define a mitered contacting surface 24. In a square or rectangular frame, the mitered surfaces 24 are oriented at a substantially 45° angle relative to the length of the frame section 22. Thus, when the two adjacent frame sections 22 are placed together with their mitered surfaces 24 in face-to-face contact, a 90° angled corner is formed.

Each frame section 22 has a side wall 26. The side wall 26 has at least one exterior side or surface 28 which is adapted to face the exterior of the assembled frame. Each side wall 26 also has at least one interior side or surface 30 which is adapted to face the interior of the assembled frame.

The side wall 26 defines, at each end of the frame section 22, a first channel 32 on the interior side 30. The first channel 32 extends inwardly of the frame section from the mitered face 24 for at least a portion of the length of the frame section 22. Preferably, the first channel 32 at each end of the frame section 22 extends along the frame section 22 so as to join and communicate with the first channel 32 at the other end of the frame section 22, thereby forming a single, continuous first channel 32 along the entire length of the frame section 22.

The first channel 32 faces inwardly when the section 22 is assembled with the other sections to form a frame. A pair of spaced-apart flanges, first or bottom flange 36 and second or top flange 38 extend from opposite sides of the first channel 32 to define a narrow opening to the first channel 32.

Preferably, the first and second flanges 36 and 38 associated with the first channel 32 define a first bearing surface 39 and a second bearing surface 40, respectively. The two bearing surfaces 39 and 40 are oriented in a plane that would be generally normal to a plane of a picture when the picture is mounted in the frame assembled from the frame sections. In the preferred embodiment the bottom of the first channel 32 is substantially parallel to the flange bearing surfaces 39 and 40.

Preferably, though not required, each frame section 22 also has a second channel 42 oriented generally normal to the first channel 32 and opening toward the back of the picture frame when the frame sections are assembled to form the frame. The second channel 42 is defined by spaced-apart first and second parallel walls 52 and 54 which are integral with the frame section side wall 26. The first wall 52 is on the exterior side of section 22 and the second wall 54 is spaced inwardly of the first wall 52 on the interior side of frame section 22.

The second wall 54, defining the inner side of the second channel 42, also preferably defines an undercut groove 56 extending generally parallel with the second channel 42 and opening thereto.

As with the first channel 32, both the second channel 42 and undercut groove 56 may extend inwardly from each end of the frame section 22 for a predetermined distance. However, as in the case of the first channel 32, the second channel 42 and its undercut groove 56 at one end of the section 22 may extend along the length of the frame section 22 to join with the second channel and undercut groove extending from opposite end of the frame section 22 to form a single, continuous channel and groove along the entire length of the frame section 22.

Preferably, each frame section includes an inwardly extending shoulder 58 which is oriented so that it is generally parallel with the plane of a picture when a picture is mounted in the frame assembled from the frame sections. As illustrated in FIG. 3, a sheet of material 59, such as a pane of glass, picture, mat, or backing board, or an assembly of one or more of such materials, may be placed through the open back of the frame against the inner surface of each frame section shoulder 58.

FIG. 3 illustrates a sheet of material 59, such as a pane of glass 59, supported by the shoulder 58 of the left-hand frame section 22. For purposes of illustration, the sheet 59 has been shown moved forward of the right-hand section 22 so as not to obscure the structure of that right-hand section 22. When the left-hand and right-hand frame sections 22 are secured tightly together to form the frame corner, the sheet 59 would of course be properly positioned on the shoulders of both sections, as well as on the shoulders of the other frame sections from which the frame is assembled.

Figure 2:
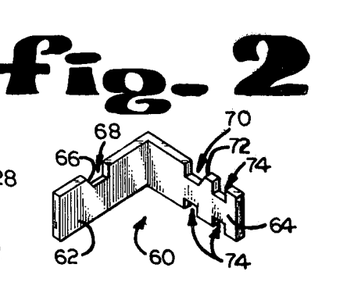
FIG. 2 is a perspective view of the corner coupling member or bracket which is a component of the present invention.

To hold the adjacent frame sections together to form a corner of the frame, a novel bracket 60 is provided as illustrated in FIG. 2. The bracket 60 has a pair of legs, first leg 62 and second leg 64, which are disposed at an angle substantially identical to the angle formed by the two frame sections at the frame corner. In the embodiment illustrated, the bracket 60 has a substantially 90° angle formed between the first leg 62 and the second leg 64.

The legs 62 and 64 each have dimensions of width and thickness whereby the bracket first and second legs can be disposed within the first channels of first and second frame sections, respectively, forming the corner of a frame.

The first leg 62 of the bracket 60 is adapted to be slidably received within the first channel 32 of the left-hand frame section 22 as illustrated in FIG. 3. Similarly, the right-hand leg 64 of the bracket 60 is adapted to be slidably disposed within the first channel 32 of the right-hand frame section 22. To this end, the first and second legs 62 and 64, respectively, each have dimensions of width and thickness whereby the legs can be disposed within the first channels 32 of the frame sections. Further, the width of each of the legs is greater than the opening defined by the first channel flanges 36 and 38 so that the bracket 60 is retained by these flanges within the channels.

In the preferred embodiment of the bracket 60 as illustrated in FIG. 2, the first leg 62 defines a slanting engagement surface 66. The slanting engagement surface forms one wall of a slot 68 which is defined at a margin of the first leg 62 of the bracket 60. The slanting engagement surface 66 lies in a plane generally normal to a plane defining the length and the width dimensions of the first leg 62.

The slanting engagement surface 66 extends into the first leg 62 at an angle relative to the length of the first leg 62 from the margin of the first leg 62. A portion of the engagement surface adjacent the margin of the first leg 62 is thus further from the second leg 64 than a portion of the engagement surface 66 that is further inwardly of the margin of leg 62. Specifically, the distance between the slanting engagement surface 66 and the second leg 64 decreases with increasing distance of the engagement surface 66 from the margin of the first leg 62. In other words, the slanting engagement surface is at an obtuse angle relative to the length of the first leg and faces away from the distal end of the first leg.

The second leg 64 of the bracket 60, if desired, have a slot 70, similar to slot 68 in the first leg 62. This slot 70 is defined in part by a slanting engagement surface 72 similar to the slanting engagement surface 66 in the first leg 62.

The second leg 64 may also be provided with additional notches if desired. Three additional notches 74 are illustrated in FIG. 2 for the second leg 64 of the bracket 70. The notches 74 are substantially square shaped and are formed in the top and bottom margins of the leg 64.

Figure 4:
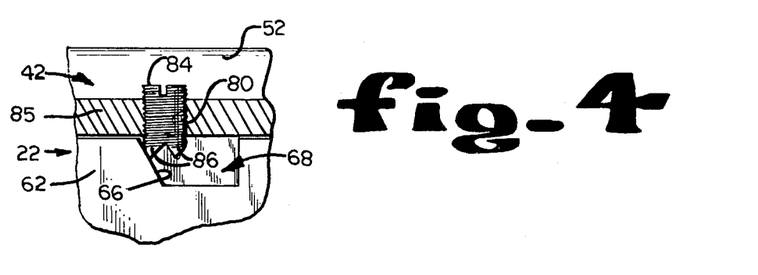
FIG. 4 is a greatly enlarged, fragmentary, cross-sectional view taken generally along the plane 4—4 in FIG. 3.

When the frame sections 22 are to be assembled to form a frame, four brackets 60 are used. One bracket 60 is provided at each corner of the frame and is inserted into the first channel 32 of the adjacent frame sections 22 as illustrated in FIG. 3. Preferably, as best illustrated in FIG. 4, each frame section 22 is provided with a threaded bore or aperature 80 extending from the rear exterior portion of the frame, through frame section 85 at the bottom of the second channel 42, and into the first channel 32. A threaded fastener, such as a screw 80 is threadingly engaged with the frame section 22 through the bore 80 with the distal end 86 of the screw projecting into the first channel 32 and engaging the slanting engagement surface 66 of the bracket first leg 62.

The threaded bore 80 and screw 84 function as a locking means associated with the one frame section 22 for engaging simultaneously the bracket engagement surface 66 and the frame section 22. Operation of the locking means, as by turning the screw 84, urges the first leg 62 of the bracket along the one frame section 22 in which it is disposed (in the direction away from the other of the two frame sections at the frame corner) so as to draw the facing regions (the miter surfaces 24) of the two frame sections together at the corner.

The movement of the first leg 62 of the bracket along the one frame section 22 in which it is disposed will occur if the frame section 22 in which the bracket leg 62 is disposed is restrained from movement, as by holding that frame section while turning the screw 84. Alternatively, if that frame section 22 which contains the first leg 62 of the bracket is allowed to move, and if the bracket or the other adjacent frame section connected to the bracket is restrained, then the first frame section 22 will move relative to the fixed bracket first leg 62. In other words, if one component is held fixed relative to the others, the other components move relative to the fixed component. The novel structure of the present invention accommodates any combination of relative movement between the components during the tightening or locking process, but the end result is the same—the two frame sections are drawn together tightly at the corner of the frame.

In the embodiment illustrated in FIGS. 3 and 4 the adjacent frame section 22 that receives leg 64 of bracket 60 also has a threaded bore 80 at the end in the frame section portion 85 defining the bottom of the channel 42 for receiving a screw 84. Tightening the screw against the bracket leg slanting wall 72 will draw the two frame sections together at the corner in the same manner as defined above with respect to the bracket first leg 62. Of course, the screws in both frame sections would be tightened as necessary to ensure that each leg of the bracket is engaged by a screw and so that the two frame sections are drawn together to form a tight, rigid, firm corner.

As illustrated in FIGS. 3 and 4, the threaded bore 80 is oriented generally perpendicular to the plane of the picture frame (i.e., perpendicular to the plane of a picture mounted in the frame). Further, the slanted wall 66 of the bracket leg 62 is oriented at an angle with respect to the plane of the picture frame. However, this relationship can be reversed. That is, the wall 66 may be perpendicular to the plane of the picture frame and that the threaded bore 80 may be disposed at an angle relative to the plane of the picture frame. This would permit the distal end 86 of the screw 84 to engage such a perpendicular wall of the bracket slot 68 and to thus effect a relative displacement between the frame section and the bracket 62 to urge the ends of the two frame sections together to form a tight, rigid, firm corner.

A removable or separate fastener, such as screw 84, need not be used to force the bracket 60 to draw the frame sections into tight engagement. With reference to FIG. 4, the screw 84 and threaded receiving aperture 80 for the screw would not be required in a modified form of the invention. Rather, the frame section portion 85 defining the bottom of the channel 42 would be initially fabricated without any hole defined therein. Subsequently, after the bracket leg 62 has been properly inserted in the channel 42 of the frame section 22, the frame section portion 85 above the slanted wall 66 of the bracket leg 62 would be swaged downwardly against the bracket slanting wall 66.

The swaging of the frame section portion 85 would then function in a manner analogous to the tightening of the screw 84 against the bracket slanting wall 66. The swaging of the frame section portion 85 against the slanting wall 66 creates a reaction force that causes relative movement of the frame section and the bracket 60 for urging the end of the frame section against the adjacent frame section to form a rigid, firm corner. The swaging of the frame section portion 85 against the slanting wall portion 66 of the bracket thus functions as a locking means in the same manner as the screw 84 in the illustrated embodiment. The adjacent corner frame section could be similarly swaged against the slanting wall 72 of the other leg of bracket 60. Alternatively, a screw, such as screw 84, could be used for the adjacent corner frame section.

Figure 5:
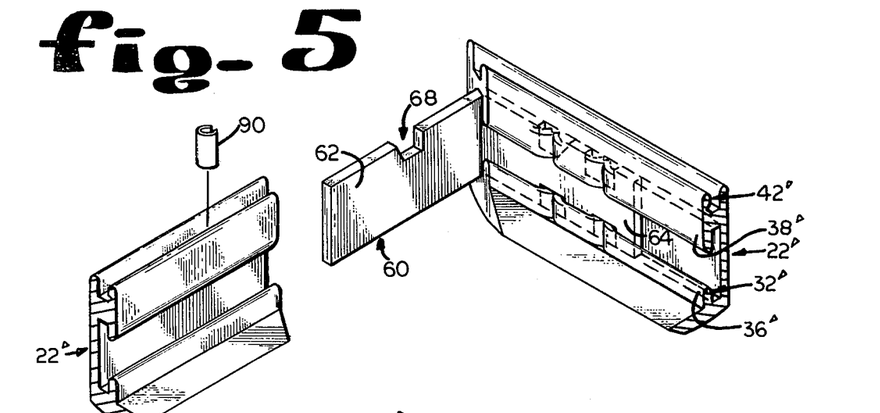
FIG. 5 is an enlarged, partially exploded, perspective view of a picture frame assembly showing an alternate manner in which the bracket cooperates with the picture frame sections to form a firm, tight, rigid corner.

FIG. 5 illustrates an alternate embodiment of securing frame sections 22' together with the novel bracket 60 of the present invention. The frame sections 22' have substantially the same structure as the frame sections 22 described above with reference to FIG. 3. However, instead of using a screw, such as screw 84 in FIG. 4, to tighten the frame sections, a roll pin 90 may be forced into a suitable aperature (not illustrated but similar to bore 80 in FIG. 4 without threads). Also, a solid dowel pin (not illustrated) may be used in place of a roll pin.

If a solid dowel pin or roll pin is used, the bore for receiving such a pin need not be oriented perpendicular to the plane of the frame and the slanting wall 66 of the bracket need not be slanted as illustrated in FIGS. 3-4. As described above with respect to an alternate method for using the screw 84, the bracket leg notch 68 need not have a slanting wall 66. Rather, the wall may be substantially vertical and oriented generally perpendicular to the plane of the frame. In such a case, the bore for receiving the dowel pin or roll pin would be angled to enable the pin to engage the perpendicular wall of the slot 68 in the bracket and cause relative displacement between the bracket and frame section to urge the two frame sections together so as to form a rigid, firm corner.

Also, a locking means embodying a screw or roll pin need not be used on both of the two adjacent frame sections 22' at a corner of the frame. Specifically, FIG. 5 illustrates portions of the right-hand frame section 22' swaged into engagement with the bracket 60 to restrain the bracket 60 tightly within the right-hand frame section 22'. In particular, portions of the first channel upper flange 38 and first channel lower flange 36 are deformed into the slots 70 and 74 in the second leg 64 of the bracket 60.

The swaged engagement of the bracket 60 with one of the two frame sections 22' at a frame corner may be more efficiently effected with suitable tools and prior to distributing the unassembled frame sections to consumers. Preferably, for example, a consumer would purchase a package of frame sections 22' with a bracket 60 already swaged onto each separate frame section 22'.

Typically, a consumer would purchase a package containing two frame sections 22' of one length and another package containing two frame sections of a different length or of the same length. This permits the customer to have a selection of the size and shape frame desired. For example, the customer might purchase a package of two 10 inch frame sections and a second package of two 20 inch frame sections so as to be able to construct a rectangular frame having the dimensions of 10 inches by 20 inches.

Each frame section 22' in each package would have a single bracket already swaged onto one end. The other end of each frame section 22' would have a suitable hole for receiving a screw or pin by which the frame sections would be tightened together to form the frame. Thus, the four frame sections could be assembled with only four screws (or roll pins).

On the other hand, with frame section kits sold to professional frame makers, the end of each frame section opposite the bracket might not be provided with a hole and fastener. Instead, the professional frame maker could use suitable swaging tools or machines for swaging the one leg of the bracket tightly in the receiving frame section.

Alternatively, the kit could contain four frame sections. Two of the four frame sections 22' would already have brackets 60 swaged onto each end. Each of the remaining two frame sections 22' would be provided in the kit without a bracket 60 swaged onto either end. When assembled, the frame sections could be tightened by swaging or with screws. Again, if screws were used, only four screws would be required.

Figure 6:
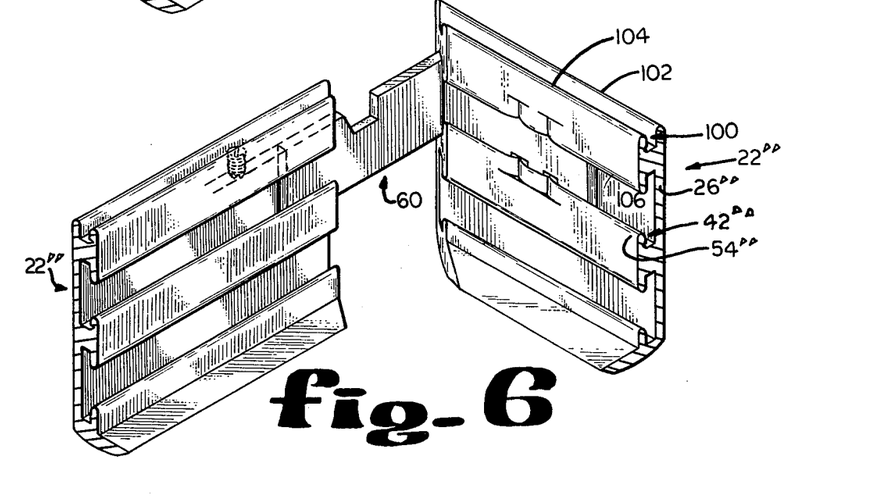
FIG. 6 is a view similar to FIG. 5 but showing an alternate form of the frame sections.

Another modified frame section assembly is illustrated in FIG. 6. Each frame section 22" is formed substantially as illustrated from frame sections 22' in FIG. 5 except that each frame section 22" has a side wall 26" that extends beyond a second channel 42" to define a top channel 100.

The top channel 100 is defined between an outer wall 102 and an inner wall 104. Extending below, in coplanar relationship with the inner wall 104, is a downwardly projecting flange 106. Flange 106 cooperates with the upwardly extending wall 54" adjacent the second channel 42" to receive a leg of the bracket 60. Thus, the flange 106, wall 54", and second channel 42" function together as another "first channel" to retain the bracket 60 in a manner analagous to how the bracket 60 is retained in the first channel 32 of the first embodiment described above with reference to FIG. 3.

The frame sections 22" have an increased height compared to those frame sections 22 or 22' illustrated in FIGS. 3 and 5, respectively. The increased height of frame sections 22" can be used when relatively thick materials are to be framed.

The mounting brackets 60 are preferably fabricated from steel or some other suitable material. The fasteners 84, such as the screws or roll pins, are preferably also fabricated from steel or other suitable material that will not deform excessively when subjected to the forces generated as the frame sections are drawn tight against each other. If the bracket 60 and fastening members are fabricated from a suitably hard material, such as steel, the frame sections need not be made from that material. The frame sections may be made from extruded aluminum or other softer material.

When the fastening member and brackets are fabricated from steel or some other suitably hard material, problems associated with cold flow of less hard materials, such as aluminum, are eliminated. Thus, the frame will remain tight and rigid. The frame sections of the present invention may also be made in a composite form wherein the exterior portions are of a relatively soft material and wherein the inner portions (defining the various channels and aperatures) are made from a material having the necessary rigidity.

In the preferred embodiment illustrated in the figures, the bracket 60 is oriented so that the planes of the legs 62 and 64 are generally normal to the plane of the picture frame (i.e., normal to the plane of the picture or document mounted within the frame). It is to be understood, however, that the bracket may have a configuration permitting the legs to be oriented in a plane parallel to the plane of the picture frame.

In such a situation, the screw, pin, or swaged portion of the frame would be moved against the bracket 60 in a plane generally parallel to the picture frame. For example, if a screw 84 was used to engage the slanting surface 66 of the bracket leg, the screw would be threadingly engaged in a bore oriented with its longitudinal axis generally parallel to the plane of a picture mounted within the frame. The bore may be located to permit insertion of the screw from the inside of the frame or the bore may be located to permit insertion of the screw from the outside of the frame. Obviously, locating the bore to permit insertion of the screw from inside the frame would be aesthetically preferable.

Of course, if the bracket was oriented with the bracket legs in a plane generally parallel to the picture frame plane, a screw or pin need not be used. The frame sections could be swaged against the bracket legs from the inside or outside of the frame in a manner analogous to that described above with respect to FIG. 6. In addition, the brackets need not have a slanting wall 66. Rather, the fastener or swaged portions of the frame sections may be suitably angled to effect relative displacement between the frame sections and the bracket.

Figure 7:
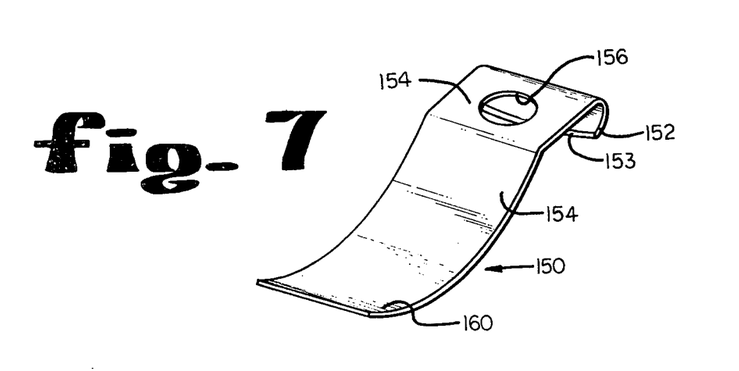
FIG. 7 is a perspective view of a retaining clip for urging the glass, mat, picture, and backing board forward against the front shoulder of the picture frame.
Figure 8:
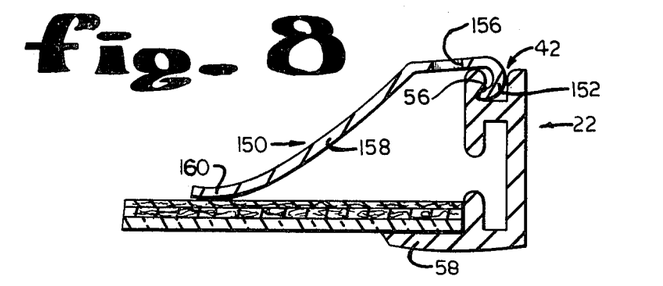
FIG. 8 is an enlarged, fragmentary, cross-sectional view showing the clip of FIG. 7 properly installed in the frame.

FIGS. 7 and 8 illustrate a spring clip 150 formed from a strip of resilient material. The clip 150 has a first end portion 152 which is reversely curved for being received within the second channel 42 of a frame section 22 of the type previously described with reference to FIG. 3. The distal end of the reversely curved first end portion 152 is received within the undercut groove 56. Preferably, as illustrated in FIG. 7, the leading edge of the distal end of the portion 152 is curved in a convex configuration across the end of the clip to facilitate insertion and removal of the clip end portion 152 in the undercut groove 56.

The clip 150 has a flat portion 154 defining an aperature 156 therethrough. The flat portion 154 is adapted to be aligned generally parallel with the vertical surface or wall on which the frame is hung when the clip 150 is properly mounted on the frame as illustrated in FIG. 8.

The clip 150 has a curving portion 158 which terminates in a slightly upwardly curved end portion 160. The end portion 160 bears against the backing board or other material mounted in the frame. The clip 150 thus maintains the material within the frame and biases the material toward the shoulder 58 of the frame sections 22.

Figure 9:
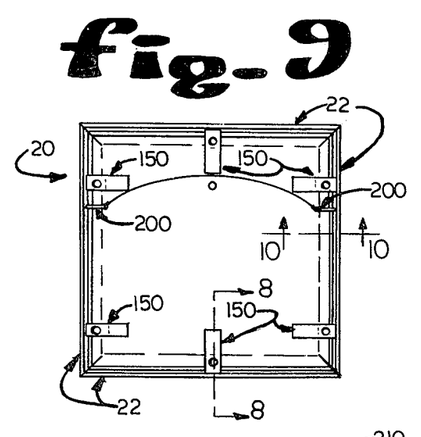
FIG. 9 is a view of a back of a generally square picture frame showing a hanging wire initially positioned on the frame with hanger clips.

As best illustrated in FIG. 9, a plurality of such clips 150 can be mounted around the periphery of the frame to securely maintain the material within the frame. If desired, the frame may be suspended on a vertical wall by placing the frame so that a clip 150 mounted in the top horizontal frame section is oriented with a nail or screw on the wall projecting through the hole 156 in that clip.

Figure 14:
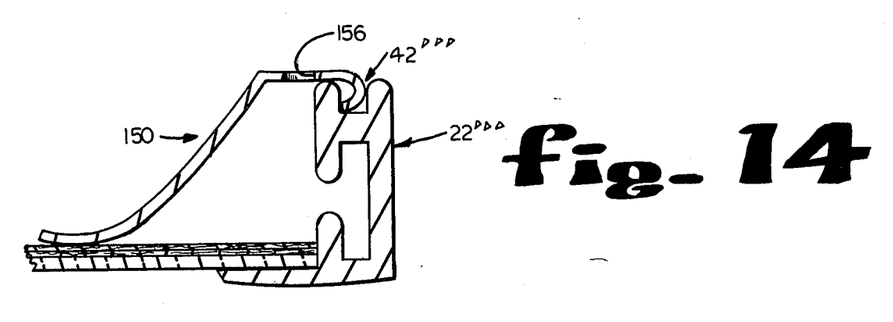
FIG. 14 is a view similar to FIG. 8, but showing a slightly modified form of the frame section.

FIG. 14 illustrates another embodiment of the frame using the clip 150 of FIGS. 7 and 8. Specifically, a frame section 22''' is provided with a configuration substantially identical to frame section 22 illustrated in FIG. 3 except that the undercut groove 56 of frame section 22 is not provided in the frame section 22'''. The reversely curved end portion 152 of the clip 150 will be retained within the second channel 42''' even without an undercut groove if the curvature of the end portion 152 is suitably formed relative to the depth and width of the second channel 42'''.

The clip 150 may be used with a frame section having increased height, such as frame sections 22'' illustrated in FIG. 6. The clip end portion 152 may be received within the upper channel 100 in those cases where relatively thick materials are to be framed. However, if relatively thin materials are framed with such frame sections, the clip 150 may be disposed with the end portion 152 received within the next lower channel 42'''.

Figure 10:
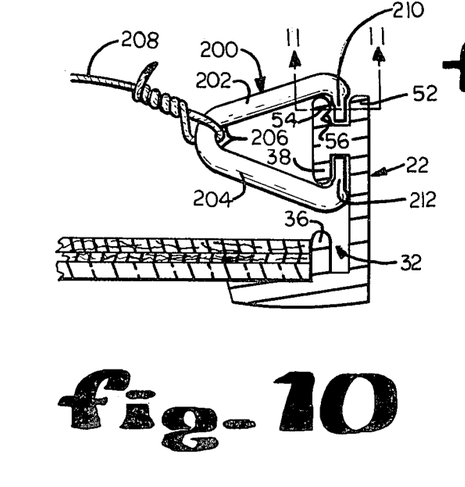
FIG. 10 is a greatly enlarged, fragmentary, cross-sectional view taken generally along the plane 10—10 in FIG. 9 to better illustrate the structure of one of the hanger clips.

FIGS. 9–13 illustrate the use of a novel hanger clip 200 by which a picture frame may be hung using picture frame hanging wire. Specifically, as best illustrated in FIGS. 9 and 10, a pair of such clips 200 are provided for being engaged with opposing side frame sections 22 of a picture frame. As best illustrated in FIG. 10, each clip 200 is prefereably made of an elongate, resilient wire that has been formed with two legs 202 and 204 which merge to define a picture frame hanging wire receiving notch 206. Picture frame hanging wire 208 may be looped around the clip 200 at the notch 206 and secured by wrapping the free end of the wire 208 around the standing portion of the wire.

Figures 11, 13:
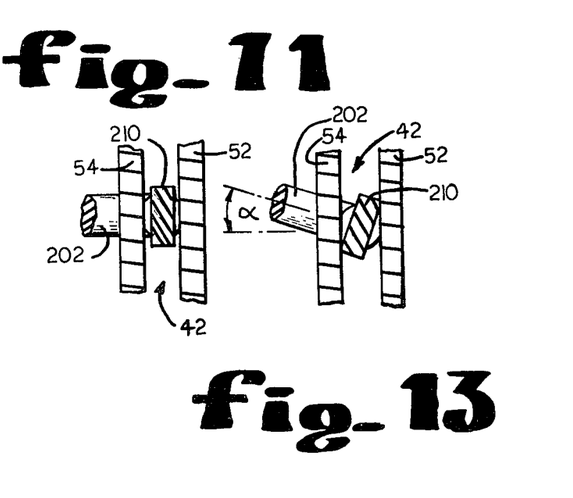
FIG. 11 is an even more enlarged fragmentary, cross-sectional view taken generally along the plane 11—11 in FIG. 10.
FIG. 13 is a view similar to FIG. 11, but showing the wire and a hanging clip turned by the tension force exerted by the wire when the frame is hanging as illustrated in FIG. 12.

The clip legs 202 and 204, respectively, are bent or angled to define a pair of spaced-apart opposing end portions 210 and 212, respectively, that are substantially aligned on a common axis. As best illustrated in FIG. 11, end 210 has a substantially rectangular cross-section. The width of the rectangular cross-section of end 210 is less than the width of the second channel 42 defined between the first and second walls 52 and 54. However, the length of the cross-section of end 210 is greater than the spacing between the walls 52 and 54.

Similarly, end 212 of leg 204 of clip 200 is deformed into a shape having a substantially rectangular cross-section for fitting within channel 32 adjacent the flange 38. Consequently, the clip 200 can be mounted on the frame section 22 as illustrated in FIG. 10 by grasping the end portions 210 and 212 and pulling them apart to a distance sufficient that the end portions fit over the downwardly extending flange 38 and upwardly extending second wall 54. Owing to the resiliency of the clip, the legs 202 and 204 will spring back to the shape illustrated for the clip in FIG. 10 so that the clip end portions 210 and 212 are properly disposed within the frame section 22.

When the clips are disposed, as illustrated in FIG. 10, and when they are maintained in planes generally perpendicular to the length of the frame sections in which they are disposed, the clips 200 may be slid along the frame sections to any desired position, such as the positions illustrated in FIG. 9. Subsequently, when it is desired to lock the clips 200 into position on the frame sections 22, the clips 200 are rotated a small amount by finger pressure so that the clip end portions 210 and 212 engage and lock in the frame sections as shown in FIG. 13. FIG. 13 illustrates the turning of one of the clips 200 through an angle alpha to effect the locking action. It has been found that an angle alpha of between about 10° and 15° is sufficient to lock the clips. Some deformation of the spring clip material may occur to aid the locking of the clips.

Figure 12:
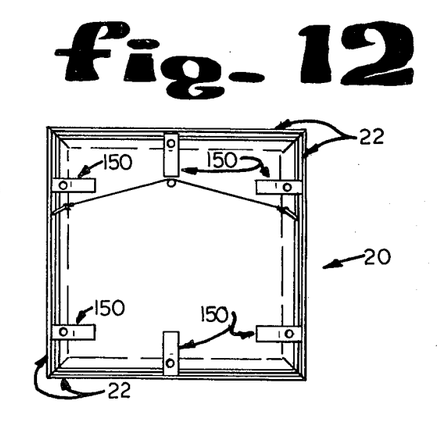
FIG. 12 is a back view of the frame similar to FIG. 9, but showing the frame hanging by the wire from a nail.

When the clips 200 are locked at an angle, the clips have the orientation on the back of the frame as illustrated in FIG. 12. The wire 208 may then be positioned over a nail or screw 220 which extends from the wall on which the picture is to be hung.

The clips 200 need not be moved through the angle alpha (FIG. 13) by pushing them with one's fingers or with any other tool. Instead, when the clips 200 are properly positioned on the frame sections as illustrated in FIG. 9, the frame hanging wire 208 may be immediately positioned over the screw or nail 220 (as illustrated in FIG. 12). The weight of the picture frame will tip the notched end of each clip 200 upwardly to orient the clips at the angle sufficient to lock the clips within the frame sections in which they are disposed.

The clips 200 may be used for purposes other than hanging the picture frame. For example, with relatively large frames (i.e., frames having relatively long frame section lengths), the frame sections may tend to sag, bend, or bow. In some cases, it is desirable to prevent such bowing of the frame sections by tying opposed pairs of frame sections together across the back of the frame with a wire. To this end, clips 200 may be disposed on opposite sides of the frame and a wire may be looped between them and tensioned to pull the opposed frame sections towards each other to eliminate outward bowing of the frame.

Similarly, outward bowing of frame sections can be achieved by looping wire between the resilient clips 150. Specifically, the wire may be looped through the apertures 156 of clips 150 on opposed frame sections and the wire then may be tensioned to draw the opposed frame sections together to eliminate bowing. Clips 150 used for this purpose would preferably have a thickened section or extruded portion defining the aperture 156 to provide a greater contact surface for the wire looped therethrough.

Figure 15:
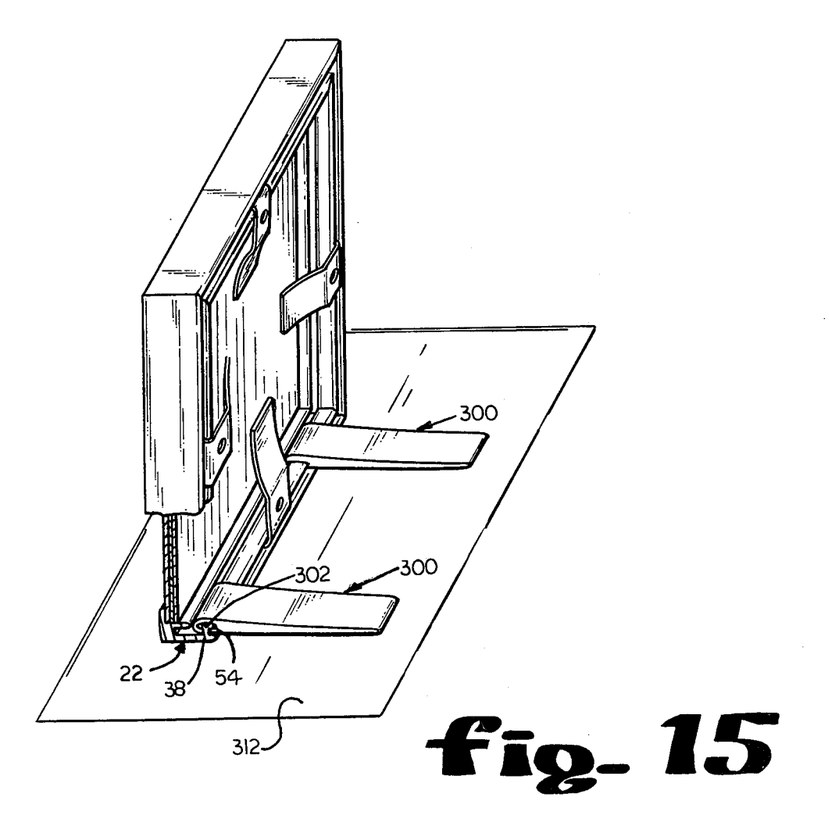
FIG. 15 shows a frame in perspective from the back and mounted at an angle with respect to a horizontal support surface by means of a base mounting member.

FIG. 15 illustrates a novel device for maintaining a picture frame in a substantially upright orientation on a horizontal support surface such as a table 312. Specifically, one or two elongate base members 300 are provided for being engaged with a frame section 22 defining the bottom horizontal portion of the frame. Each elongate base member defines a channel 302 across one end. The channel 302 is undercut on each side so that each base member 300 may be slidably carried on one of the frame sections 22 with one of the first channel flanges 38 and with the second wall 54 being received within the undercut regions of the channel 302.

One or more of the base members 300 may be slid onto the frame section 22 before the frame sections are assembled to form a frame. As illustrated in FIG. 14, the base members 300 extend outwardly over, and are in contact with, the horizontal support surface, such as the table surface 312. The base members 300 thus support the frame at a nearly vertical angle with respect to the surface 312. The frame may be supported at a substantially vertical angle or may be supported at any other suitable angle between a completely horizontal and a completely vertical orientation. The particular angle would depend upon the orientation of the channel 302 within the base member 300.

With the structure of the present invention, it is seen that the frame and any of the additional components secured thereto, may be easily disassembled as well as assembled.

It will be readily observed from the foregoing detailed description of the invention and in the illustrative embodiments thereof that numerous variations and modifications may be effected without departing from the true spirit and scope of the novel concept of the principles of this invention.

What is claimed is:

1. Components for constructing a back-loading picture frame comprising:

a plurality of frame sections for being assembled into a picture frame, any two of which sections are adapted to be oriented at an angle to form a corner of the assembled frame at the adjacent ends of the two sections, each frame section having at each end a sidewall defining a first channel for facing inwardly when the section is assembled with the other sections to form the frame, said first channel at each frame section end extending along the frame section for at least a portion of the length of the frame section, each frame section further having a pair of spaced-apart flanges extending from opposite sides of said first channel to define an opening to said first channel;

a bracket having a first leg and a second leg disposed at an angle substantially identical to the angle formed by said two frame sections at said frame corner, said legs each having dimensions of width and thickness whereby said bracket can be disposed within the first channels of said two frame sections, the width of each said leg being greater than the opening defined by said flanges thereby to retain the bracket within said first channels of said two frame sections, at least said first leg defining a notch opening toward the back of the assembled frame, a portion of said notch being defined by a slanting planar engagement surface extending into said first leg from a margin of said first leg at an angle relative to the length of said first leg, the distance between said slanting engagement surface and said second leg decreasing with increasing notch depth; and locking means associated with at least one of said two frame sections and with said bracket first leg for being disposed within said one frame section from the back of the assembled frame to simultaneously engage said bracket slanting engagement surface and said one frame section when said bracket first leg is disposed within said first channel of said one frame section and when said bracket second leg is disposed within said first channel of the other of said two frame sections forming said corner whereby movement of said locking means relative to said one frame section causes relative movement between said bracket first leg and said one frame section in the direction parallel to the length of said one frame section to draw the facing regions of said two frame sections together at the corner.

2. The bracket in accordance with claim 1 in which the thickness of the bracket first leg is less than the width of the bracket first leg and less than the length of the bracket first leg and in which the thickness of the bracket second leg is less than the width of the bracket second leg and less than the length of the bracket second leg.

3. The components in accordance with claim 1 in which each said frame section includes a second channel opening toward the back of the assembled frame, said second channel being defined by spaced-apart first and second parallel walls integral with said frame section sidewall, said second wall being spaced inwardly of said first wall, each said frame section also including an inwardly extending retaining shoulder oriented so that it is generally parallel with and adjacent the plane of a picture when the picture is mounted in the assembled frame, said components further including a strip of material having at least a first end portion reversely curved for being received within said second channel whereby the other end of said strip may press against a generally flat sheet mounted within the assembled frame so as to maintain said flat sheet within said frame and biased toward said frame section retaining shoulders.

4. The components in accordance with claim 1 in which each of said two flanges of each frame section presents an inner bearing surface facing the bottom of its associated first channel, each of said bearing surfaces associated with each first channel being oriented in a plane that is generally normal to the assembled frame picture plane.

5. The components in accordance with claim 1 in which one of said frame sections has a threaded aperture communicating with the first channel defined in said one frame section and in which said locking means includes a screw adapted to be threadingly engaged with said frame section through said aperture from the back of the assembled frame with the distal end of said screw projecting into said first channel and engaging said slanting engagement surface of said bracket when said first leg of said bracket is disposed within the first channel of said one frame section.

6. The components in accordance with claim 1 in which said locking means includes a roll pin.

7. The components in accordance with claim 1 in which each said frame section further defines a second channel opening toward the back of the assembled frame;
in which one of said frame sections has a threaded aperture communicating between said first channel and said second channel; and
in which said locking means includes a screw adapted to be threadingly engaged with said one frame section through said aperture from said second channel with a distal end of the screw projecting into said first channel and engaging said slanting engagement surface of said bracket when said first leg of said bracket is disposed within the first channel of said one frame section.

8. The components in accordance with claim 1 in which each said frame section includes a second channel oriented generally normal to said first channel and opening toward the back of said picture frame when said frame sections are assembled to form a frame, said second channel being defined by spaced-apart first and second parallel walls integral with said frame section side wall, said second wall being spaced inwardly of said first wall and defining an undercut groove extending generally parallel with said second channel and opening thereto.

9. The components in accordance with claim 8 in which each said frame section includes an inwardly extending shoulder oriented so that it is generally parallel with the plane of a picture when the picture is mounted in a frame assembled from said plurality of frame sections and in which said component further includes a strip of material having at least a first end portion reversely curved for being received within said second channel with the distal end of said reversely curved portion being received with said undercut groove whereby the other end of said strip may press against a generally flat sheet mounted within a frame formed by the assembly of said frame sections so as to maintain said flat sheet within said frame and biased toward said frame section shoulders.

10. The components in accordance with claim 9 in which said strip of material defines an aperture therethrough adjacent said reversely curved end portion for receiving a portion of a nail or screw projecting from a wall whereby a picture frame assembled from said components may be hung on the wall.

11. The components in accordance with claim 1 in which
each said frame section includes a second channel oriented generally normal to said first channel and opening toward the back of said picture frame when said plurality of frame sections are assembled to form a frame, said second channel being defined by spaced-apart first and second parallel walls integral with said frame section side wall, said second wall being spaced inwardly of said first wall, and in which
said components further include a clip comprising a member having two legs which merge to define a picture frame hanging wire receiving notch, the distal ends of said legs being angled and formed to defined a pair of spaced-apart, opposing end portions substantially aligned on a common axis, each said end portion having a substantially rectangular cross section whereby one said end portion may be inserted into said first channel adjacent one of said flanges and whereby the other of said end portions may be inserted into said second channel after which said clip can be rotated about said axis so that said clip end portions engage the sides of the first and second channels to restrain the clip against movement along the channels.

12. The components in accordance with claim 1 in which
each said frame section includes a second channel oriented generally normal to said first channel and opening toward the back of said picture frame when said frame sections are assembled to form a frame, said second channel being defined by spaced-apart first and second parallel walls integral with said frame section side wall, said second wall being spaced inwardly of said first wall, and in which
said components further include an elongate base member defining a third channel across the base member adjacent one end, said third channel being undercut along each side of the third channel whereby said base member may be slidably carried on one of said frame sections with one of said first channel flanges and with said second wall each being received within a different one of said undercut regions of said third channel so that a picture frame assembled from said plurality of frame sections with said base member carried on said one frame section may be supported by said base member at an angle with respect to a substantially horizontal supporting surface on which said base member and said engaged one frame section are placed.

13. The components in accordance with claim 1 in which said bracket second leg also defines a slanting engagement surface and in which the other of said two frame sections has a threaded aperture communicating with the first channel defined in said other frame section and further including a locking member adapted to be retained within said other frame section aperture with the distal end of said locking member engaging said bracket second leg slanting engagement surface when said bracket is disposed within the first channel of said other frame section.

14. The components in accordance with claim 1 in which the first channel at one end of the frame section extends to and joins the first channel at the other end of the same frame section to thereby form a single continuous channel.

15. Components for constructing a back-loading picture frame comprising:
a plurality of frame sections, any two of which sections are adapted to be oriented at an angle to form a corner of said frame at the adjacent ends of the two sections, each frame section having at each end a sidewall defining a first channel for facing inwardly when the section is assembled with the other sections to form a frame, said first channel at each frame section end extending along the frame section for at least a portion of the length of the frame section, each frame section further having a pair of spaced-apart flanges extending from opposite sides of said first channel to define an opening to said first channel, each said frame section further including a second channel opening toward the back of the frame assembled from said frame sections, said channel being defined by spaced-apart first and second parallel walls integral with said frame section sidewall, said second wall being spaced inwardly of said first wall and defining an undercut groove extending generally parallel with said second channel and opening thereto, each said frame section including an inwardly extending retaining shoulder oriented so that it is generally parallel with the plane of the picture when the picture is mounted in a frame assembled from said plurality of frame sections;

a bracket having a first leg and a second leg disposed at an angle substantially identical to the angle formed by two of said frame sections at a frame corner, said legs each having dimensions of length, width, and thickness whereby said bracket can be disposed within the first channels of said two frame sections, the width of said legs being greater than the opening defined by said flanges at said first channel thereby to retain the bracket within said first channels of said two frame sections, at least said first leg defining a slanting engagement surface;

locking means associated with at least one of said two frame sections and with said bracket first leg for engaging simultaneously said bracket engagement surface and said one frame section when said bracket first leg is disposed within said first channel of said one frame section and when said bracket second leg is disposed within said first channel of the other of said two frame sections forming said corner whereby operation of said locking means causes relative movement between said bracket first leg and said one frame section in the direction parallel to the length of said one frame section to draw the facing regions of said two frame sections together at the corner; and a strip of material having at least a first end portion reversely curved for being received within said second channel with the distal end of said reversely curved first end portion being received within said undercut groove whereby the other end of said strip may press against a generally flat sheet mounted within a frame formed by the assembly of said frame sections so as to maintain said flat sheet within said frame and biased toward said frame section retaining shoulders.

16. The components in accordance with claim 15 in which said strip of material defines an aperture therethrough adjacent said reversely curved end portion for receiving a portion of a nail or screw projecting from a wall whereby a picture frame assembled from said components may be hung on the wall.

17. Components for constructing a back-loading picture frame comprising:

a plurality of frame sections, any two of which sections are adapted to be oriented at an angle to form a corner of said frame at the adjacent ends of the two sections, each frame section having at each end a sidewall defining a first channel for facing inwardly when the section is assembled with the other sections to form a frame, said first channel at each frame section end extending along the frame section for at least a portion of the length of the frame section, each frame section further having a pair of spaced-apart flanges extending from opposite sides of said first channel to define an opening to said first channel, each said frame section further including a second channel opening toward the back of the frame assembled from said frame sections, said second channel being defined by spaced-apart first and second parallel walls integral with said frame section sidewall, said second wall being spaced inwardly of said first wall;

a bracket having a first leg and a second leg disposed at an angle substantially identical to the angle formed by two of said frame sections at a frame corner, said legs each having dimensions of length, width, and thickness whereby said bracket can be disposed within the first channels of said two frame sections, the width of said legs being greater than the opening defined by said flanges at said first channel thereby to retain the bracket within said first channels of said two frame sections, at least said first leg defining a slanting engagement surface;

locking means associated with at least one of said two frame sections and with said bracket first leg for engaging simultaneously said bracket engagement surface and said one frame section when said bracket first leg is disposed within said first channel of said one frame section and when said bracket second leg is disposed within said first channel of the other of said two frame sections forming said corner whereby operation of said locking means causes relative movement between said bracket first leg and said one frame section in the direction parallel to the length of said one frame section to draw the facing regions of said two frame sections together at the corner; and a clip comprising a member having two legs which merge to define a picture frame hanging wire receiving notch, the distal ends of said legs being angled and formed to define a pair of spaced-apart, opposing end portions substantially aligned on a common axis, each said end portion having a substantially rectangular cross section whereby one said end portion may be inserted into said first channel adjacent one of said flanges and whereby the other of said end portions may be inserted into said second channel after which said clip can be rotated about said axis so that said clip end portions engage the sides of the first and second channels to restrain the clip against movement along the channels.

18. Components for constructing a back-loading picture frame comprising:

a plurality of frame sections, any two of which sections are adapted to be oriented at an angle to form a corner of said frame at the adjacent ends of the two sections, each frame section having at each end a sidewall defining a first channel for facing inwardly when the section is assembled with the other sections to form a frame, said first channel at each frame section end extending along the frame section for at least a portion of the length of the frame section, each frame section further having a pair of spaced-apart flanges extending from opposite sides of said first channel to define an opening to said first channel, each said frame section further including a second channel opening toward the back of the frame assembled from said frame sections, said second channel being defined by spaced-apart first and second parallel walls integral with said frame section sidewall, said second wall being spaced inwardly of said first wall;

a bracket having a first leg and a second leg disposed at an angle substantially identical to the angle formed by two of said frame sections at a frame corner, said legs each having dimensions of length, width, and thickness whereby said bracket can be disposed within the first channels of said two frame sections, the width of said legs being greater than the opening defined by said flanges at said first channel thereby to retain the bracket within said first channels of said two frame sections, at least said first leg defining a slanting engagement surface;

locking means associated with at least one of said two frame sections and with said bracket first leg for engaging simultaneously said bracket engagement surface and said one frame section when said bracket first leg is disposed within said first channel of said one frame section and when said bracket second leg is disposed within said first channel of the other of said two frame sections forming said corner whereby operation of said locking means causes relative movement between said bracket first leg and said one frame section in the direction parallel to the length of said one frame section to draw the facing regions of said two frame sections together at the corner; and an elongate base member defining a third channel across the base member adjacent one end, said third channel being undercut along each side of the third channel whereby said base member may be slidably carried on one of said frame sections with one of said first channel flanges and with said second wall each being received within a different one of said undercut regions of said third channel so that a picture frame assembled from said plurality of frame sections with said base member carried on said one frame section may be supported by said base member at an angle with respect to a substantially horizontal supporting surface on which said base member and said engaged one frame section are placed.

* * * * *